United States Patent
Ahmed et al.

(10) Patent No.: US 9,533,293 B2
(45) Date of Patent: Jan. 3, 2017

(54) MODIFIED ZEOLITE SECOND STAGE HYDROCRACKING CATALYST AND USE OF THEREOF FOR HYDROCARBON CONVERSION

(71) Applicant: King Fahd University of Petroleum and Minerals, Dhahran (SA)

(72) Inventors: Shakeel Ahmed, Dhahran (SA); Mohammad Ashraf Ali, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 188 days.

(21) Appl. No.: 14/254,107

(22) Filed: Apr. 16, 2014

(65) Prior Publication Data

US 2015/0298106 A1     Oct. 22, 2015

(51) Int. Cl.
*B01J 29/16* (2006.01)
*C10G 47/20* (2006.01)
*B01J 37/20* (2006.01)
*B01J 29/08* (2006.01)

(52) U.S. Cl.
CPC ............. *B01J 29/166* (2013.01); *C10G 47/20* (2013.01); *B01J 37/20* (2013.01); *B01J 2029/081* (2013.01); *B01J 2229/16* (2013.01); *B01J 2229/186* (2013.01); *B01J 2229/20* (2013.01); *B01J 2229/37* (2013.01); *B01J 2229/42* (2013.01); *B01J 2523/00* (2013.01)

(58) Field of Classification Search
CPC ......... B01J 29/166; C10G 47/18; C10G 47/20
See application file for complete search history.

(56) References Cited

U.S. PATENT DOCUMENTS

| | | | |
|---|---|---|---|
| 4,701,431 A | 10/1987 | Pine | |
| 5,286,692 A * | 2/1994 | Zhao | C10G 47/20 208/111.01 |
| 7,160,436 B2 | 1/2007 | Benazzi et al. | |
| 2012/0258852 A1 | 10/2012 | Martinez et al. | |

OTHER PUBLICATIONS

Liu Bai-Jun, et al. Hydrocracking performance of USY modified by dealumination with oxalic acid, Journal of Fuel Chemistry and Technology Apr. 2010, 3 pages.

* cited by examiner

*Primary Examiner* — Renee Robinson
*Assistant Examiner* — Derek Mueller
(74) *Attorney, Agent, or Firm* — Oblon, McClelland, Maier & Neustadt, L.L.P.

(57) ABSTRACT

A hydrocracking catalyst, containing a USY zeolite modified by treatment with an organic acid to remove aluminum, an alumina binder, two or more metals selected from metals of Groups VIB and VIII, and cerium in the range of 0.1 to 5.0 wt %. A method of making the hydrocracking catalyst, whereby a USY zeolite is treated with an organic acid to remove aluminum from the zeolite structure and subsequently impregnating with a rare earth metal of the Lanthanide series to form a modified USY zeolite. The modified USY zeolite is mixed with alumina comprising a peptizing agent and impregnated with two or more metals selected from metals of Groups VIB and VIII.

13 Claims, No Drawings

MODIFIED ZEOLITE SECOND STAGE HYDROCRACKING CATALYST AND USE OF THEREOF FOR HYDROCARBON CONVERSION

BACKGROUND OF THE INVENTION

Field of the Disclosure

The present invention relates to a USY catalyst, a method for modifying a USY zeolite, preparation of a hydrocracking catalyst, and its use for hydrocracking of petroleum fractions such as vacuum gas oil. The hydrocracking catalyst is employed for preparing valuable light and medium boiling range hydrocarbons from heavy hydrocarbons of vacuum gas oil fractions of crude oil.

Description of Related Art

In the development of hydrocracking processes, two basic types of catalyst have been used in hydrocracking: amorphous silica/alumina and crystalline silica/alumina (zeolites). Both types have distinct performance characteristics. Dual catalytic systems have also been developed to meet the demand of refining situations where higher middle distillate production and good quality products are demanded. These are two-stage processes: the first stage resembles hydrotreatment where the main reactions are hydrodesulfurization, hydrodenitrogenation and some conversion; and in the second stage, complete conversion by cracking is performed.

The basic principle in hydrocracking catalyst design is to obtain a balance between hydrogen transfer-functionality and cracking-functionality to achieve a desired slate of products without coke deposition. The choice of catalyst depends, apart from economic consideration, on factors such as feed properties and characteristics of desired products. For example, while choosing the appropriate hydrogenating/dehydrogenating function, it must be considered whether the feed contains poisons such as sulfur, nitrogen and oxygen which make the use of noble metals infeasible. Also, if a catalyst with a given acidity is to be used for obtaining products with a boiling point similar to the feed and with high saturation of the aromatic fraction, a noble metal, instead of a non-noble metal, is recommended as the hydrogenating function. On the other hand, catalysts with a high acidity/hydrogenation ratio should be prepared if products with a ratio of branched to normal paraffins higher than the feed, and therefore, gasoline with a higher octane number, is to be obtained. Excessive acidity tends to cause coking, but this can be overcome with higher hydrogen functionality. Higher hydrogen pressure is also effective but has other disadvantages. Thus, in order to prepare a suitable hydrocracking catalyst, a good balance between the two functions must be obtained.

Modifying the acidity of the zeolite and controlling the hydrogenation function by incorporating active metals are means to change catalyst function and activity. The acidity modifications include dealumination by steam treatment, acid leaching, phosphorus impregnation or the combination of these methods. Often, hydrocracking is carried out in the presence of a catalyst containing sulfided Ni-W or Ni-Mo metals. However, these catalysts have lesser hydrogenation functionality and produce more aromatics than saturates, which are required as high quality products. A high performance hydrocracking catalyst that gives higher conversion and more saturates under hydrocracking conditions is desirable but has not before been prepared.

BRIEF SUMMARY

An object of the invention is a hydrocracking catalyst, including modified USY zeolite, alumina binder, two or more metals selected from metals of Group VIB and VIII, and cerium in the range of 0.1 to 5.0 wt %.

In an embodiment, the metal of Group VIB is W.

In another embodiment, the metal of Group VIII is Ni.

In another embodiment, the USY zeolite is treated with an organic acid to remove aluminum from the zeolite structure.

In one embodiment of the invention, the metals of Group VIB or VIII are in sulfided form.

In another embodiment, the total Si/Al molar ratio of the USY zeolite is in the range of 6-10.

In another embodiment of the invention, the amount of the USY zeolite is 35 wt % based on the total weight of the catalyst.

In one aspect of the invention, the hydrocracking product has higher hydrogen to carbon ratio.

DETAILED DESCRIPTION

The present invention includes a modified USY zeolite based hydrocracking catalyst for preparing valuable light hydrocarbons from petroleum based heavy hydrocarbons derived from crude oil. A method is also provided which enables the production of valuable light hydrocarbons from heavy petroleum fractions like vacuum gas oil. In particular, among a variety of hydrocracking catalysts, catalyst components are selectively included, so that a maximum amount of light hydrocarbons are achieved.

Cracking is a process whereby complex organic molecules, i.e. heavy hydrocarbons, are broken down into simpler molecules, i.e. light hydrocarbons, by breaking of carbon-carbon bonds in the precursors. The rate of cracking and the end products are strongly dependent on the temperature and presence of catalysts. Cracking is the breakdown of large hydrocarbon molecules into smaller, more useful alkanes and alkenes.

Hydrocracking as used herein is the process of breaking a long-chain of hydrocarbons into short ones assisted by the presence of an elevated partial pressure of hydrogen gas. The function of hydrogen is the purification of the hydrocarbon stream from sulfur and nitrogen hetero-atoms. Examples of heavy hydrocarbons include polynuclear aromatics and long chain paraffins and isoparaffins. The examples of heavy hydrocarbons include naphthalene, anthracene, phenanthrene and hexadecane. The light hydrocarbons include saturated hydrocarbons, such as methane, ethane propane and butane. The hydrocracking catalyst rearranges and breaks down the hydrocarbon chains and adds hydrogen to aromatics and olefins to produce napthenes and alkanes. The major products from hydrocracking include jet fuel and diesel. High octane rating gasoline fractions and LPG are also produced. These products have a very low content of sulfur and other contaminants.

The heavy hydrocarbons used as the feed are the main constituents of the inexpensive part of the crude oils. Because the hydrocracking reaction of the present invention is carried out under conditions of high temperature and high pressure, the hydrocracking performance of the hydrocracking catalyst having modified USY zeolite is higher as compared to the catalyst made of as-received USY zeolite. In order to prepare valuable light aromatic hydrocarbons from polycyclic aromatic hydrocarbons, a hydrocracking catalyst is required.

The hydrocracking catalyst according to the present invention includes (i) modified USY zeolite; (ii) alumina as a binder; and (iii) one or more metals selected from among metals of Groups VIII and VIB.

In particular, the metal of Group VIII of the hydrocracking catalyst is nickel and the metal of Group VIB is tungsten. Preferably, the nickel or tungsten component is present in the form of a sulfide. The sulfidation of a metal oxide having no hydrogenation activity may result in suitable hydrogenation activity and high resistance to poisoning caused by sulfur and nitrogen compounds present in the feed.

The Si/Al molar ratio of the USY zeolite that constitutes the hydrocracking catalyst falls in the range of 6-10, thus providing the cracking function of the hydrocracking catalyst necessary for the production of light hydrocarbons.

In the hydrocracking catalyst, USY zeolite exists in the form of extrudates mixed with alumina as a binder. An amount of USY zeolite in the extrudates is preferably 10-95 wt % based on a total weight of the catalyst to maintain the mechanical strength of a support and ensure cracking function of the hydrocracking catalyst necessary for production of light hydrocarbons.

The amount of nickel or tungsten is 1 to 20 wt %, preferably 8 to 10 wt %, based on the total weight of the catalyst in order to ensure the hydrogenation activity of the hydrocracking catalyst for maximize production of light hydrocarbons.

The modified zeolite based hydrocracking catalyst is obtained a method, comprising:

a) treating the USY zeolite with an organic acid for the removal aluminum from the zeolite structure and subsequently impregnating the zeolite with a rare earth metal of the Lanthanide series of the periodic table;

b) mixing the modified USY zeolite with alumina containing acetic acid as a peptizing agent; and c) impregnating the zeolite mixed with alumina with a base metal of group VIB and VIII.

In step (a), the organic acid is preferably oxalic acid in a concentration of from 0.05M to 1M, preferably about 0.1M. Other organic acids may be used but the dealumination results will be different. These includes acetic acid, formic acid, etc. The rare earth metal of the Lanthanide series is preferably cerium in the range of 0.1 wt % to 5.0 wt %, preferably 0.2 wt % to 2.0 wt %, and especially preferably between 0.3 to 1.0 wt %.

In step (b), the peptizing agent is 5-20% acetic acid, preferably 8 to 15%, or about 11% acetic acid. A weight ratio of the USY zeolite to the alumina is from 10 to 80% preferably 25 to 75%, preferably 50%.

In step (c), the base metal of group VIB is preferably W or Mo, and the base metal of group VIII is preferably Co or Ni.

Evaluation tests performed in a flow reactor indicate that the catalysts of the invention, when used in the hydrocracking of hydrotreated vacuum gas oil as the feed have high activity and selectivity for second stage hydrocracking. Thus, the catalyst of the invention has the advantage of significant improvement in hydrotreated vacuum gas oil hydrocracking.

USY zeolite powder is used in the preparation of the catalysts. The USY zeolite powders are USY zeolite having silica to alumina mole ratio of from about 4.5 to 6.0, preferably from 4.5 to about 5.3. A unit cell size of the zeolite is from 24.30 to 24.55, preferably from 24.35 to 24.50, and especially preferably from 24.35 to about 24.48. The preferred USY zeolite powder has a sodium level of less than about 0.3 wt % calculated $Na_2O$, preferably from 0.05 to 0.3 wt %. The surface area of the zeolite is preferably from about 600 to about 790, especially preferably from 600 to about 650 $m^2/g$. The surface area is determined using nitrogen adsorption at 77 K using multi-point BET method at a relative pressure, $p/p_o$ of 0.01 to 0.05.

Examples of the alumina binders include, for example, pseudoboehmite, gamma alumina and bayerite. These binders are commercially available and are used to prepare alumina-based catalysts. Condea Chimie GmbH, through its PURALOX and CATALOX family of high purity activated aluminas, Aluminum Company of America (ALCOA) through its CP-100 series of alumina, LaRoche Chemicals, through its VERSAL family of aluminas and Catalyst & Chemicals Industries Co., Ltd. (CCIC), through its Cataloid AP series of aluminas, provide suitable alumina powders which can be used as binders in preparing the instant catalysts. Such alumina fine powders have a particle size within the range of about 30 to 70 micron, preferably from about 50 to about 60 micron. Such alumina fine powders are exemplified by CCIC's Cataloid AP-1 alumina and ALCOA's CP-100 alumina.

Examples are provided to additionally explain the principle of the present invention, but the intent of the examples is not to limit the scope of the present invention. The scope of the invention extends to other zeolites such as beta, other alumina binders and other metals such as cobalt and molybdenum.

EXAMPLES

The following examples illustrate the modified USY zeolite and its further use in making hydrocracking catalyst, and its comparison with other examples of modified USY zeolites and other examples of hydrocracking catalysts. The examples include the modification of zeolite acidity using a number of methods including acid treatment, steaming at different temperatures, and cerium loading and combinations thereof. The examples also include the testing process of the modified USY zeolites for cumene cracking reaction in pulse micro reactor. The examples also include the testing process of the hydrocracking catalyst prepared from modified USY zeolites for hydrocracking reaction in flow reactor using hydrotreated vacuum gas oil as the feed.

Examples—Modified USY Zeolite

Example of Invention—Modification of USY Zeolite (0.125M Oxalic Acid Dealumination and 0.5% Ce Impregnation)

The as-received USY zeolite (Total acidity 1.164 mmol/g) was modified by acid washing method to remove some of the aluminum from the zeolite structure to reduce its acidity. The procedure for treating the USY-zeolite with organic acid was as follows: As-received sample of USY Zeolite was treated with 0.125M oxalic acid solution. The solution of oxalic acid was prepared by dissolving 5.63 g of oxalic acid in de-ionized water to make 500 ml of the solution. 20.0 g of USY Zeolite (dried at 110° C. overnight) was added to the above prepared oxalic acid solution and stirred at room temperature for 45 minutes. The solid zeolite was then filtered out and washed with plenty of distilled water. Then the zeolite was filtered, washed with plenty of distilled water to remove excess of the acid and aluminum dislodged from the zeolite. The sample was dried at 50° C. for two hours. The dried sample was calcined in muffle furnace in air under the following temperature program: From room temperature to 120° C. @ 2° C./min, Soak at 120° C. for 30 min., From 120° C. to 250° C. @ 5° C./min, Soak 250° C. for 30 min, From 250° C. to 500° C. @ 10° C./min, and finally Soak at 500° C. for 2 hours. To the calcined acid washed modified USY zeolite, 0.5% cerium was impregnated using CeNO$_3$ (Aldrich cat. # 23,853-8) aqueous solution by incipient wetness method.

Comparative Examples

Comparative Example No. 1A—Modification of USY Zeolite (0.125M Oxalic Acid Dealumination and 1.0% Ce Impregnation)

The as-received USY Zeolite was modified by acid washing method to remove some of the aluminum from the zeolite structure to reduce its acidity. The procedure for treating the USY Zeolite with organic acid was as follows: As-received sample of USY Zeolite was treated with 0.125M oxalic acid solution. The solution of oxalic acid was prepared by dissolving 5.63 g of oxalic acid in de-ionized water to make 500 ml of the solution. 20.0 g of USY Zeolite (dried at 110° C. overnight) was added to the above prepared oxalic acid solution and stirred at room temperature for 45 minutes. The solid zeolite was then filtered out and washed with plenty of distilled water. Then the zeolite was filtered, washed with plenty of distilled water to remove excess of the acid and aluminum dislodged from the USY zeolite. The sample was dried at 50° C. for two hours. The dried sample was calcined in muffle furnace in air under the following temperature program: From room temperature to 120° C. @ 2° C./min, Soak at 120° C. for 30 min., From 120° C. to 250° C. @ 5° C./min, Soak 250° C. for 30 min, From 250° C. to 500° C. @ 10° C./min, and finally Soak at 500° C. for 2 hours. To the calcined acid washed modified USY Zeolite, 1.0% cerium was impregnated using CeNO$_3$ (Aldrich cat. # 23,853-8) aqueous solution by incipient wetness method.

Comparative Example No. 2A—Modification of USY Zeolite (0.05M Oxalic Acid Dealumination)

The as-received USY Zeolite was modified by acid washing method to remove some of the aluminum from the zeolite structure to reduce its acidity. The procedure for treating the USY zeolite with organic acid was as follows: As-received sample of USY Zeolite was treated with 0.5M oxalic acid solution. The solution of oxalic acid was prepared by dissolving 5.63 g of oxalic acid in de-ionized water to make 500 ml of the solution. 20.0 g of USY zeolite (dried at 110° C. overnight) was added to the above prepared oxalic acid solution and stirred at room temperature for 45 minutes. The solid zeolite was then filtered out and washed with plenty of distilled water. Then the zeolite was filtered, washed with plenty of distilled water to remove excess of the acid and aluminum dislodged from the USY zeolite. The sample was dried at 50° C. for two hours. The dried sample was calcined in muffle furnace in air under the following temperature program:

From room temperature to 120° C. @ 2° C./min, Soak at 120° C. for 30 min., From 120° C. to 250° C. @ 5° C./min, Soak 250° C. for 30 min, From 250° C. to 500° C. @ 10° C./min, and finally Soak at 500° C. for 2 hours.

Comparative Example No. 3A—Modification of USY Zeolite (0.125M Oxalic Acid Dealumination)

The as-received USY Zeolite was modified by acid washing method to remove some of the aluminum from the zeolite structure to reduce its acidity. The procedure for treating the USY zeolite with organic acid was as follows: As-received sample of Zeolite USY was treated with 0.125M oxalic acid solution. The solution of oxalic acid was prepared by dissolving 5.63 g of oxalic acid in de-ionized water to make 500 ml of the solution. 20.0 g of USY Zeolite (dried at 110° C. overnight) was added to the above prepared oxalic acid solution and stirred at room temperature for 45 minutes. The solid zeolite was then filtered out and washed with plenty of distilled water. Then the zeolite was filtered, washed with plenty of distilled water to remove excess of the acid and aluminum dislodged from the zeolite. The sample was dried at 50° C. for two hours. The dried sample was calcined in muffle furnace in air under the following temperature program: From room temperature to 120° C. @ 2° C./min, Soak at 120° C. for 30 min., From 120° C. to 250° C. @ 5° C./min, Soak 250° C. for 30 min, From 250° C. to 500° C. @ 10° C./min, and finally Soak at 500° C. for 2 hours.

Comparative Example No. 4A—Modification of USY Zeolite (0.25M Oxalic Acid Dealumination)

The as-received USY Zeolite was modified by acid washing method to remove some of the aluminum from the zeolite structure to reduce its acidity. The procedure for treating the USY Zeolite with organic acid was as follows: As-received sample of USY Zeolite was treated with 0.25M oxalic acid solution. The solution of oxalic acid was prepared by dissolving 5.63 g of oxalic acid in de-ionized water to make 500 ml of the solution. 20.0 g of USY-zeolite (dried at 110° C. overnight) was added to the above prepared oxalic acid solution and stirred at room temperature for 45 minutes. The solid zeolite was then filtered out and washed with plenty of distilled water. Then the zeolite was filtered, washed with plenty of distilled water to remove excess of the acid and aluminum dislodged from the zeolite. The sample was dried at 50° C. for two hours. The dried sample was calcined in muffle furnace in air under the following temperature program: From room temperature to 120° C. @ 2° C./min, Soak at 120° C. for 30 min., From 120° C. to 250° C. @ 5° C./min, Soak 250° C. for 30 min, From 250° C. to 500° C. @ 10° C./min, and finally Soak at 500° C. for 2 hours.

Comparative Example No. 5A—Modification of USY Zeolite (Steamed at 610° C.)

The as-received USY zeolite was modified by steaming at 610 ° C. for 6 hours in a steaming unit to remove some of the aluminum from the zeolite structure thus to reduce its acidity. The procedure for steaming of the zeolite USY was as follows: As-received sample of zeolite USY was filled in the tubes of steaming unit. The process of steaming was started and was continued for 6 hours. Then the tubes were cooled and the steamed zeolite USY was removed from the tubes and stored in dry containers.

Comparative Example No. 6A—Modification of USY Zeolite (Steamed at 710° C.)

The as-received zeolite USY was modified by steaming at 710° C. for 6 hours in a steaming unit to remove some of the aluminum from the zeolite structure thus to reduce its acidity. The procedure for steaming of the USY zeolite was as follows: As-received sample of USY zeolite was filled in the tubes of steaming unit. The process of steaming was started and was continued for 6 hours. Then the tubes were cooled and the steamed USY zeolite was removed from the tubes and stored in dry containers.

Comparative Example No. 7A—Modification of USY Zeolite (Steamed at 810 ° C.)

The as-received USY zeolite was modified by steaming at 810° C. for 6 hours in a steaming unit to remove some of the aluminum from the zeolite structure thus to reduce its acidity. The procedure for steaming of the USY zeolite was as follows: As-received sample of USY zeolite was filled in the tubes of steaming unit. The process of steaming was started and was continued for 6 hours. Then the tubes were cooled and the steamed USY zeolite was removed from the tubes and stored in dry containers.

Comparative Example No. 8A—Modification of USY Zeolite (Steamed at 810° C. and ion-exchanged to produce H-Form)

The as-received USY zeolite was modified by steaming at 810° C. for 6 hours in a steaming unit to remove some of the aluminum from the zeolite structure thus to reduce its acidity. The procedure for steaming of the USY zeolite was as follows: As-received sample of USY zeolite was filled in the tubes of steaming unit. The process of steaming was started and was continued for 6 hours. Then the tubes were cooled and the steamed USY zeolite was removed from the tubes and stored in dry containers. Then the steamed zeolite was ion-exchanged with ammonium hydroxide and then calcined at 500° C. to produce H-Form.

Comparative Example No. 9A—Modification of USY Zeolite (0.5% Ce Impregnation)

The as-received USY zeolite (Total acidity 1.164 mmol/g) was modified by cerium loading using cerium nitrate on the powdered zeolite in order to reduce its acidity by masking some of the aluminum based acid sites. The procedure for treating the USY zeolite with cerium nitrate was as follows: As-received sample of USY zeolite was impregnated with cerium using $CeNO_3$ (Aldrich cat. # 23,853-8) aqueous solution through incipient wetness method to achieve 0.5% Ce Loading on the USY zeolite powder.

Comparative Examples No. 10A—Modification of USY Zeolite (1.0% Ce Impregnation)

The as-received USY zeolite (Total acidity 1.164 mmol/g) was modified by cerium loading using cerium nitrate on the powdered zeolite in order to reduce its acidity by masking some of the aluminum based acid sites. The procedure for treating the USY zeolite with cerium nitrate was as follows: As-received sample of USY zeolite was impregnated with cerium using $CeNO_3$ (Aldrich cat. # 23,853-8) aqueous solution through incipient wetness method to achieve 1.0% Ce loading on the USY zeolite powder.

Comparative Examples No. 11A—Modification of USY Zeolite (Steamed at 610° C. and 1.0% Ce Impregnation)

The as-received USY zeolite was modified by steaming at 610° C. for 6 hours in a steaming unit to remove some of the aluminum from the zeolite structure thus to reduce its acidity. The procedure for steaming of the USY zeolite was as follows: As-received sample of USY zeolite was filled in the tubes of steaming unit. The process of steaming was started and was continued for 6 hours. Then the tubes were cooled and the steamed USY zeolite was removed from the tubes and stored in dry containers. Then the steamed powdered USY zeolite was modified by cerium loading using cerium nitrate in order to reduce its acidity by masking some of the aluminum based acid sites. The procedure for treating the USY zeolite with cerium nitrate was as follows: As-received sample of USY zeolite was impregnated with cerium using $CeNO_3$ (Aldrich cat. # 23,853-8) aqueous solution through incipient wetness method to achieve 1.0% Ce loading on the USY zeolite powder.

Comparative Examples No. 12A—As-Received USY Zeolite

The as-received USY zeolite was calcined at 500° C. for 3 hours and stored in dry glass container.

Examples—Cumene Cracking reaction using Modified & As-received USY Zeolites

Example No. 1B—Testing Process of Modified and As-Received USY Zeolites

Cumene cracking experiments were carried out in a pulse reactor supplied by Ohkura Riken Co. Ltd., Japan. Prior to activity test, the catalyst (sample weight 0.1 g) was sulfided in-situ with a mixed gas flow (60 ml/min, 2 kg/cm$^2$) of 95% hydrogen and 5% hydrogen sulfide at 400° C. for 2 h. After sulfidation of the catalyst, the gas flow rate was switched to the reaction condition ($H_2$ 60 ml/min, 2 kg/cm$^2$). The USY zeolite samples were tested at five reaction temperatures, 250° C., 275° C., 300° C., 320° C. and 350° C. The cumene (0.3 ml) was injected and its conversion was measured by an on-line gas chromatography. The products of the reaction were $C_1$ to $C_4$ gases. The material balance of reactant and product confirmed by the total GC peak area was more than 99%. The cumene cracking performance of the catalyst was determined by comparing the peak area of the cumene before and after reaction. Using this method, the as-received and modified USY zeolite samples were checked for their cumene cracking performance. Comparative results of cumene cracking are illustrated in TABLE I and are further explained in the subsequent tables.

TABLE I

Cumene cracking results at five temperatures (250, 275, 300, 325, 350° C.) of Example of Invention and Examples of Comparison.

| Example | Catalyst Designation | Temperature of Cumene Cracking, ° C. | | | | |
|---|---|---|---|---|---|---|
| | | 250 | 275 | 300 | 325 | 350 |
| Example of Invention Example 1 | USY-0.125 MOx-0.5 wt % Ce | 62.9 | 67.1 | 71.2 | 74.3 | 79.2 |
| | USY-0.125 MOx-1.0 wt % Ce loading | 53.0 | 52.9 | 52.1 | 54.7 | 59.6 |
| Example 2 | USY-0.05 MOx | 57.6 | 60.2 | 59.5 | 56.0 | 65.4 |
| Example 3 | USY-0.125 MOx | 56.5 | 57.8 | 56.5 | 62.1 | 66.5 |
| Example 4 | USY-0.25 MOx | 31.5 | 35.6 | 40.5 | 50.6 | 59.6 |
| Example 5 | USY-Steamed at 610° C. | 38.3 | 45.4 | 52.6 | 58.7 | 63.4 |
| Example 6 | USY-Steamed at 710° C. | 20.4 | 27.7 | 34.1 | 42.0 | 47.0 |
| Example 7 | USY-Steamed at 810° C. | 0.0 | 0.0 | 3.6 | 4.9 | 6.3 |
| Example 8 | USY-Steamed at 810° C. and Ion-exchanged to H-Form | 15.6 | 11.0 | 12.0 | 18.5 | 21.5 |
| Example 9 | USY-0.5 wt % Ce loading | 51.9 | 55.8 | 58.0 | 59.3 | 64.9 |
| Example 10 | USY-1.0 wt % Ce loading | 50.5 | 60.0 | 59.1 | 60.1 | 65.2 |
| Example 11 | USY-Steamed at 610° C. and 1.0 wt % Ce loading | 42.6 | 49.0 | 52.6 | 58.2 | 61.8 |
| Example 12 | USY As-received | 50.5 | 55.7 | 57.9 | 58.8 | 61.2 |

As shown in Table II, the modified USY zeolite of Example of Invention showed 19 to 37% higher cumene conversion as compared to the modified USY zeolite of comparative example 1.

TABLE II

Cumene cracking results of Example of Invention compared with comparative example 1.

| Example | Catalyst Designation | Temperature of Cumene Cracking, ° C. | | | | |
|---|---|---|---|---|---|---|
| | | 250 | 275 | 300 | 325 | 350 |
| Example of Invention | USY-0.125 MOx-0.5 wt % Ce | 62.9 | 67.1 | 71.2 | 74.3 | 79.2 |
| Comparative Example 1 | USY-0.125 MOx-1.0 wt % Ce loading | 53.0 | 52.9 | 52.1 | 54.7 | 59.6 |
| % Increase in Cumene Cracking by Example of Invention as compared to Comparative Example 1 | | 19 | 27 | 37 | 36 | 33 |

As given in Table III, the modified USY zeolite of Example of Invention showed 9 to 33% higher cumene conversion as compared to the modified USY zeolite of comparative example 2.

TABLE III

Cumene cracking results of Example of Invention compared with comparative example 2.

| Example | Catalyst Designation | Temperature of Cumene Cracking, ° C. | | | | |
|---|---|---|---|---|---|---|
| | | 250 | 275 | 300 | 325 | 350 |
| Example of Invention | USY-0.125 MOx-0.5 wt % Ce | 62.9 | 67.1 | 71.2 | 74.3 | 79.2 |
| Comparative Example 2 | USY-0.05 MOx | 57.6 | 60.2 | 59.5 | 56.0 | 65.4 |
| % Higher Cumene Cracking by Example of Invention as compared to Comparative Example 2 | | 9 | 11 | 20 | 33 | 21 |

As given in Table IV, the modified USY zeolite of Example of Invention showed 11 to 26% higher cumene conversion as compared to the modified USY zeolite of comparative example 3.

TABLE IV

Cumene cracking results of Example of Invention compared with comparative example 3.

| Example | Catalyst Designation | Temperature of Cumene Cracking, ° C. | | | | |
|---|---|---|---|---|---|---|
| | | 250 | 275 | 300 | 325 | 350 |
| Example of Invention | USY-0.125 MOx-0.5 wt % Ce | 62.9 | 67.1 | 71.2 | 74.3 | 79.2 |
| Comparative Example 3 | USY-0.125 MOx | 56.5 | 57.8 | 56.5 | 62.1 | 66.5 |
| % Higher Cumene Cracking by Example of Invention as compared to Comparative Example 3 | | 11 | 16 | 26 | 20 | 19 |

As given in Table V, the modified USY zeolite of Example of Invention showed 33 to 100% higher cumene conversion as compared to the modified USY zeolite of comparative example 4.

TABLE V

Cumene cracking results of Example of Invention compared with comparative example 4.

| Example | Catalyst Designation | Temperature of Cumene Cracking, ° C. | | | | |
|---|---|---|---|---|---|---|
| | | 250 | 275 | 300 | 325 | 350 |
| Example of Invention | USY-0.125 MOx-0.5 wt % Ce | 62.9 | 67.1 | 71.2 | 74.3 | 79.2 |
| Comparative Example 4 | USY-0.25 MOx | 31.5 | 35.6 | 40.5 | 50.6 | 59.6 |
| % Higher Cumene Cracking by Example of Invention as compared to Comparative Example 4 | | 100 | 88 | 76 | 47 | 33 |

As given in Table VI, the modified USY zeolite of Example of Invention showed 25 to 64% higher cumene conversion as compared to the modified USY zeolite of comparative example 5.

TABLE VI

Cumene cracking results of Example of Invention compared with comparative example 5.

| Example | Catalyst Designation | Temperature of Cumene Cracking, ° C. | | | | |
|---|---|---|---|---|---|---|
| | | 250 | 275 | 300 | 325 | 350 |
| Example of Invention | USY-0.125 MOx-0.5 wt % Ce | 62.9 | 67.1 | 71.2 | 74.3 | 79.2 |
| Comparative Example 5 | USY-Steamed at 610° C. | 38.3 | 45.4 | 52.6 | 58.7 | 63.4 |
| % Higher Cumene Cracking by Example of Invention as compared to Comparative Example 5 | | 64 | 48 | 35 | 27 | 25 |

As given in Table VII, the modified USY zeolite of Example of Invention showed 69 to 208% higher cumene conversion as compared to the modified USY zeolite of comparative example 6.

TABLE VII

Cumene cracking results of Example of Invention compared with comparative example 6.

| Example | Catalyst Designation | Temperature of Cumene Cracking, ° C. | | | | |
|---|---|---|---|---|---|---|
| | | 250 | 275 | 300 | 325 | 350 |
| Example of Invention | USY-0.125 MOx-0.5 wt % Ce | 62.9 | 67.1 | 71.2 | 74.3 | 79.2 |
| Comparative Example 6 | USY-Steamed at 710° C. | 20.4 | 27.7 | 34.1 | 42.0 | 47.0 |
| % Higher Cumene Cracking by Example of Invention as compared to Comparative Example 6 | | 208 | 142 | 109 | 77 | 69 |

As given in Table VIII, the modified USY zeolite of Example of Invention showed 268 to 510% higher cumene conversion as compared to the modified USY zeolite of comparative example 8.

TABLE VIII

Cumene cracking results of Example of Invention compared with comparative example 8.

| Example | Catalyst Designation | Temperature of Cumene Cracking, ° C. | | | | |
|---|---|---|---|---|---|---|
| | | 250 | 275 | 300 | 325 | 350 |
| Example of Invention | USY-0.125 MOx-0.5 wt % Ce | 62.9 | 67.1 | 71.2 | 74.3 | 79.2 |
| Comparative Example 8 | USY-Steamed at 810° C. and Ion-exchanged to H-Form | 15.6 | 11.0 | 12.0 | 18.5 | 21.5 |
| % Higher Cumene Cracking by Example of Invention as compared to Comparative Example 8 | | 303 | 510 | 493 | 302 | 268 |

As given in Table IX, the modified USY zeolite of Example of Invention showed 20 to 25% higher cumene conversion as compared to the modified USY zeolite of comparative example 9.

TABLE IX

Cumene cracking results of Example of Invention compared with comparative example 9.

| Example | Catalyst Designation | Temperature of Cumene Cracking, ° C. | | | | |
|---|---|---|---|---|---|---|
| | | 250 | 275 | 300 | 325 | 350 |
| Example of Invention | USY-0.125 MOx-0.5 wt % Ce | 62.9 | 67.1 | 71.2 | 74.3 | 79.2 |
| Comparative Example 9 | USY-0.5 wt % Ce loading | 51.9 | 55.8 | 58.0 | 59.3 | 64.9 |
| % Higher Cumene Cracking by Example of Invention as compared to Comparative Example 9 | | 21 | 20 | 23 | 25 | 22 |

As given in Table X, the modified USY zeolite of Example of Invention showed 12 to 25% higher cumene conversion as compared to the modified USY zeolite of comparative example 10.

TABLE X

Cumene cracking results of Example of Invention compared with comparative example 10.

| Example | Catalyst Designation | Temperature of Cumene Cracking, ° C. | | | | |
|---|---|---|---|---|---|---|
| | | 250 | 275 | 300 | 325 | 350 |
| Example of Invention | USY-0.125 MOx-0.5 wt % Ce | 62.9 | 67.1 | 71.2 | 74.3 | 79.2 |
| Comparative Example 10 | USY-1.0 wt % Ce loading | 50.5 | 60.0 | 59.1 | 60.1 | 65.2 |
| % Higher Cumene Cracking by Example of Invention as compared to Comparative Example 10 | | 25 | 12 | 20 | 24 | 21 |

As given in Table XI, the modified USY zeolite of Example of Invention showed 28 to 48% higher cumene conversion as compared to the modified USY zeolite of comparative example 11.

TABLE XI

Cumene cracking results of Example of Invention compared with comparative example 11.

| Example | Catalyst Designation | Temperature of Cumene Cracking, ° C. | | | | |
|---|---|---|---|---|---|---|
| | | 250 | 275 | 300 | 325 | 350 |
| Example of Invention | USY-0.125 MOx-0.5 wt % Ce | 62.9 | 67.1 | 71.2 | 74.3 | 79.2 |
| Comparative Example 11 | USY-Steamed at 610° C. and 1.0 wt % Ce loading | 42.6 | 49.0 | 52.6 | 58.2 | 61.8 |
| % Higher Cumene Cracking by Example of Invention as compared to Comparative Example 11 | | 48 | 37 | 35 | 28 | 28 |

As given in Table XII, the modified USY zeolite of Example of Invention showed 20 to 29% higher cumene conversion as compared to the modified USY zeolite of comparative example 12.

TABLE XII

Cumene cracking results of Example of Invention compared with comparative example 12.

| Example | Catalyst Designation | Temperature of Cumene Cracking, ° C. | | | | |
|---|---|---|---|---|---|---|
| | | 250 | 275 | 300 | 325 | 350 |
| Example of Invention | USY-0.125 MOx-0.5 wt % Ce | 62.9 | 67.1 | 71.2 | 74.3 | 79.2 |
| Comparative Example 12 | USY As-received | 50.5 | 55.7 | 57.9 | 58.8 | 61.2 |
| % Higher Cumene Cracking by Example of Invention as compared to Comparative Example 12 | | 25 | 20 | 23 | 26 | 29 |

The oxalic acid dealuminated USY zeolite upon characterization shows the change in aluminum contents as well as acidity characteristics. The data shown in Table XIII shows that both aluminum contents and acidity values of the dealuminated USY zeolite decrease with increasing the concentration of the oxalic acid used in the treatment process.

TABLE XIII

Effect of oxalic acid treatment on aluminum contents and acidity of USY zeolite

| Catalyst Designation | Aluminum contents, wt % | Acidity, mmol/g |
|---|---|---|
| USY-0.05 MOx | 9.80 | 0.99 |
| USY-0.125 MOx | 8.01 | 0.86 |
| USY-0.25 MOx | 1.60 | 0.16 |
| USY As-received | 10.50 | 1.16 |

Example of Invention—Preparation of Hydrocracking Catalysts

The modified USY zeolite (USY–0.125MOx–0.5wt%Ce) was mixed with alumina binder, AP-1, in a weight ratio of 50% to produce extrudates of 1 mm thickness and 3-4 mm in length using a hydraulic press and sieving system. AP-1 was obtained from CCIC, Japan and contains 11 wt % of acetic acid as peptizing agent. The zeolite mixed with alumina was impregnated with base metal of group VIB (W) and VIII (Ni) in weight percent levels of 4.125 wt % NiO and 24.15 wt % $WO_3$. This catalyst was designated as HCC-I.

Example of Comparison—Preparation of Hydrocracking Catalysts

The As-received USY zeolite was mixed with alumina binder, AP-1, in a weight ratio of 50% to produce extrudates of 1 mm thickness and 3-4 mm in length using a hydraulic press having sieving system. AP-1 was obtained from CCIC, Japan and contains 11 wt % of acetic acid as peptizing agent. The zeolite mixed with alumina was impregnated with base metal of group VIB (W) and VIII (Ni) in weight percent levels of 4.125 wt % NiO and 24.15 wt % $WO_3$. This catalyst was designated as HCC-C.

Evaluation of Hydrocracking Catalysts

Both the catalyst of invention and the catalyst of comparison were evaluated in a flow reactor. The detailed procedure and the reaction conditions were as follows: The catalyst was loaded in a tubular reactor in the middle having inert material at the top and bottom of the reactor. The feed was hydrotreated vacuum gas oil distilled from Saudi Arabian crude oil. The reaction was carried out at 380 ° C.

temperature and the hydrogen pressure was 2000 psi. The LHSV was 2 and the total run time was 10 hours.

The data shows a marked difference in the products obtained. The Catalyst of Invention shows higher amount of light products as compared to Catalyst of Comparison. The product obtained shows higher hydrogen to carbon ratio for Catalyst of Invention as compared to Catalyst of Comparison.

TABLE IVX

Comparison of product yield and composition data for Catalyst of Invention and Catalyst of Comparison.

|  | Catalyst of Invention HCC-I | Catalyst of Comparison HCC-C |
|---|---|---|
| Yields (wt %) |  |  |
| Hydrogen | 7.08 | 6.42 |
| Methane | 0.02 | 0.02 |
| Ethane | 0.07 | 0.05 |
| Propane | 0.48 | 0.31 |
| Propylene | 0.01 | 0.01 |
| Isobutane | 0.58 | 0.32 |
| n-Butane | 0.31 | 0.19 |
| Isopentane | 0.31 | 0.15 |
| n-Pentane | 0.06 | 0.04 |
| Product Composition (wt %) |  |  |
| Gas (H2 + C1 to C5) | 8.5 | 7.3 |
| Product below 221° C. | 46.9 | 34.7 |
| Product between 221-343° C. | 23.7 | 24.0 |
| Product above 343° C. | 20.9 | 33.8 |
| HDC (%) | 68.3 | 48.8 |
| H/C ratio | 2.00 | 1.84 |

The invention claimed is:

1. A hydrocracking catalyst, comprising: a USY zeolite modified by treatment with an organic acid to remove aluminum; an alumina binder; two or more metals selected from metals of Groups VIB and VIII; and cerium in the range of 0.1 to 5.0 wt. %; wherein the USY zeolite has an acidity ranging from 0.86-0.99 mmol/g.

2. The catalyst of claim 1, wherein the metal of Group VIB is W.

3. The catalyst of claim 1, wherein the metal of Group VIII is Ni.

4. The hydrocracking catalyst of claim 1, wherein at least one of the metals of Group VIB and the metals of Group VIII is in sulfided form.

5. The hydrocracking catalyst of claim 1, wherein a Si/Al molar ratio of the USY zeolite is in the range of 6-10.

6. The hydrocracking catalyst of claim 1, wherein the amount of the USY zeolite is from 25 to 50 wt % based on the total weight of the catalyst.

7. The hydrocracking catalyst of claim 1, wherein the amount of the alumina binder is from 25 to 50 wt % based on the total weight of the catalyst.

8. The hydrocracking catalyst of claim 1, comprising $WO_3$ in an amount of from 20 to 30 wt % based on a total weight of the catalyst.

9. The hydrocracking catalyst of claim 1, comprising NiO in an amount of 1 to 10 wt % based on a total weight of the catalyst.

10. A process of hydrocracking, comprising hydrocracking of a hydrotreated vacuum gas oil with the hydrocracking catalyst of claim 1.

11. The hydrocracking catalyst of claim 1, wherein the USY zeolite has an aluminum content ranging from 8.01-9.80 wt % relative to the total weight of the USY zeolite.

12. The hydrocracking catalyst of claim 1, wherein the USY zeolite has an acidity of 0.86 mmol/g.

13. The hydrocracking catalyst of claim 1, wherein the USY zeolite has an acidity of 0.99 mmol/g.

* * * * *